(12) United States Patent
Rosa et al.

(10) Patent No.: US 11,003,744 B2
(45) Date of Patent: May 11, 2021

(54) METHOD AND SYSTEM FOR SECURING BANK ACCOUNT ACCESS

(71) Applicant: AVAST SOFTWARE S.R.O., Prague (CZ)

(72) Inventors: Tomas Rosa, Praha-Petrovice (CZ); Petr Dvorak, Pardubice-Smojedy (CZ)

(73) Assignee: Avast Software s.r.o., Prague (CZ)

( * ) Notice: Subject to any disclaimer, the term of this patent is extended or adjusted under 35 U.S.C. 154(b) by 421 days.

(21) Appl. No.: 15/122,870

(22) PCT Filed: Mar. 3, 2015

(86) PCT No.: PCT/CZ2015/000016
§ 371 (c)(1),
(2) Date: Aug. 31, 2016

(87) PCT Pub. No.: WO2015/131860
PCT Pub. Date: Sep. 11, 2015

(65) Prior Publication Data
US 2017/0070882 A1    Mar. 9, 2017

(30) Foreign Application Priority Data
Mar. 3, 2014    (CZ) ................................ CZ2014-126

(51) Int. Cl.
*H04W 12/06*    (2021.01)
*G06F 21/12*    (2013.01)
*G06Q 20/32*    (2012.01)
*G06Q 20/38*    (2012.01)
(Continued)

(52) U.S. Cl.
CPC ............ *G06F 21/123* (2013.01); *G06F 21/35* (2013.01); *G06Q 20/3221* (2013.01);
(Continued)

(58) Field of Classification Search
CPC .. G06F 21/123; G06F 21/35; H04W 12/0401; H04W 12/06; G06Q 20/3226;
(Continued)

(56) References Cited

U.S. PATENT DOCUMENTS 9,503,260 B2 * 11/2016 Brands ................ H04L 63/0853
10,862,862 B2 * 12/2020 Gupta ................ H04L 61/2571
(Continued)

FOREIGN PATENT DOCUMENTS

WO        2009087539 A1    7/2009

*Primary Examiner* — Farid Homayounmehr
*Assistant Examiner* — Sanchit K Sarker
(74) *Attorney, Agent, or Firm* — Erickson Kernell IP, LLC; William B. Kircher

(57) ABSTRACT

Methods, systems and devices for securing a bank account against an unauthorized access from a portable electronic device include or include using an auxiliary security device and a portable electronic device. The portable electronic device is adapted for controlling the bank account via the Internet. The auxiliary security device and the portable electronic device communicate via a Bluetooth protocol. Secure access to the bank account with the portable electronic device is based on a combination of information that is indicative of a key that is stored in the portable electronic device and data that is indicative of the key stored in the auxiliary security device that has been transmitted to the portable electronic device.

9 Claims, 2 Drawing Sheets

(51) Int. Cl.
*G06F 21/35* (2013.01)
*H04W 12/041* (2021.01)
*H04L 9/08* (2006.01)
*H04L 9/14* (2006.01)
*H04L 9/30* (2006.01)
*H04L 9/32* (2006.01)
*H04L 29/06* (2006.01)
*H04M 1/72412* (2021.01)

(52) U.S. Cl.
CPC ....... *G06Q 20/3226* (2013.01); *G06Q 20/385* (2013.01); *H04L 9/0861* (2013.01); *H04L 9/14* (2013.01); *H04L 9/30* (2013.01); *H04L 9/3226* (2013.01); *H04L 63/06* (2013.01); *H04L 63/083* (2013.01); *H04L 63/0876* (2013.01); *H04W 12/041* (2021.01); *H04W 12/06* (2013.01); *H04L 2209/80* (2013.01); *H04M 1/72412* (2021.01)

(58) Field of Classification Search
CPC .............. G06Q 20/385; G06Q 20/3221; H04L 9/0861; H04L 9/14; H04L 9/30; H04L 9/3226; H04L 63/06; H04L 63/083; H04L 63/0876; H04L 2209/80; H04M 1/7253
See application file for complete search history.

(56) References Cited

U.S. PATENT DOCUMENTS

| | | | |
|---|---|---|---|
| 2004/0235450 A1 | 11/2004 | Rosenberg | |
| 2005/0269401 A1* | 12/2005 | Spitzer | G06Q 20/341 235/380 |
| 2006/0074698 A1 | 4/2006 | Bishop et al. | |
| 2006/0104486 A1* | 5/2006 | Le Saint | G06K 9/00013 382/115 |
| 2009/0006846 A1* | 1/2009 | Rosenblatt | H04W 12/08 713/159 |
| 2009/0132813 A1* | 5/2009 | Schibuk | G06Q 20/389 713/158 |
| 2009/0249455 A1* | 10/2009 | Hinsey | H04L 63/0853 726/5 |
| 2010/0203870 A1* | 8/2010 | Hubinak | G06Q 20/32 455/414.1 |
| 2011/0103586 A1* | 5/2011 | Nobre | H04L 9/3263 380/270 |
| 2011/0215921 A1* | 9/2011 | Ben Ayed | H04B 7/00 340/539.11 |
| 2011/0314539 A1* | 12/2011 | Horton | G06F 21/35 726/20 |
| 2013/0097429 A1* | 4/2013 | Grandcolas | H04L 63/0853 713/185 |
| 2014/0047531 A1* | 2/2014 | Zaitsev | G06F 21/123 726/9 |
| 2014/0136419 A1* | 5/2014 | Kiyohara | G06Q 20/3221 705/67 |
| 2014/0215218 A1* | 7/2014 | Brands | G06F 21/77 713/172 |
| 2014/0223183 A1* | 8/2014 | Niglio | H04L 63/0428 713/172 |
| 2015/0220912 A1* | 8/2015 | Holdsworth | G06Q 20/353 705/72 |
| 2016/0043867 A1* | 2/2016 | Bonsignore | G06F 21/34 713/168 |
| 2017/0118645 A1* | 4/2017 | Zarakas | H04W 12/06 |

* cited by examiner

METHOD AND SYSTEM FOR SECURING BANK ACCOUNT ACCESS

FIELD OF THE INVENTION

The present invention relates to a method for securing a bank account against an unauthorized access from a portable electronic device, the device comprising means for accessing the Internet as well as local wireless communication means using a short range wireless communication protocol (e.g., Bluetooth® protocol), the securing being provided using an auxiliary security device, the auxiliary security device comprising wireless communication means using a short range wireless communication protocol (e.g., Bluetooth® protocol), the method comprising the step of adapting the portable electronic device for controlling a bank account via the Internet.

BACKGROUND OF THE INVENTION

Various methods of protecting the services are known and offered by the respective providers to their clients via data networks to prevent access without due authorization. In the case of electronic banking services, for example, the clients of the respective banks ordinarily use a secure access to their bank accounts that is based on unique codes being sent to the clients' mobile telephones. Nevertheless, using such a secure method will not make sense in the case of an Internet banking service controlled via a mobile telephone, i.e., a so called mobile banking service, smart banking service or the like. Furthermore, there is a number of stand-alone devices which are usable for securing the services being provided to clients. Such devices, however, need a user interaction (pushing a button or entering a password/personal identification number (PIN), typing a previously generated code, or enabling a contactless device, such as a Near Field Communication (NFC) card, to be read by a secured system). Hence, the objective of the present invention is to suggest a technical solution which would enable to verify the authenticity of a request sent via the Internet from a portable device (mobile telephone) in a simple and easy manner, in particular when banking and similar, security sensitive, operations are concerned. Moreover, no client's interaction should be required and, thus, a considerably enhanced level of user comfort should be achievable.

SUMMARY OF THE INVENTION

The above objective is achieved by a method for securing a bank account against an unauthorized access from a portable electronic device comprising means for accessing the Internet and wireless communication means using a short range wireless protocol (e.g., Bluetooth® protocol), through an auxiliary security device, the latter device also comprising wireless communication means using a short range wireless protocol (e.g., Bluetooth® protocol), the method comprising the following step:
  i) the portable electronic device is adapted for controlling the bank account via the Internet.

According to the invention the method further comprises the following steps:
  ii) the corresponding serial number along with the address and the key comprising private part and a public part are assigned (FIG. 2 block 202) to an auxiliary security device and the serial number, address and public key of that auxiliary security device are subsequently stored in the data processing system of the respective banking institution;
  iii) the auxiliary security device is assigned (FIG. 2 block 204) to said portable electronic device in order to make both the devices ready for interacting during the calculation of the key required for accessing the respective bank account from the portable electronic device;
  iv) the portable electronic device employs the short range wireless (e.g., Bluetooth®) technology to locate said assigned auxiliary security device in the vicinity (FIG. 2 block 206);
  v) when the corresponding short range wireless (e.g., Bluetooth®) signal being transmitted by said assigned auxiliary security device and having at least a predetermined strength is detected, the key or keys required for accessing the respective bank account and/or for signing the individual banking transactions, such transactions being in accordance with a pre-selected type, are calculated on the basis of the combination of the key stored in the portable electronic device and the key stored in the auxiliary security device assigned thereto (FIG. 2 block 208).

Preferably, when the short range wireless signal (e.g., Bluetooth® signal) being transmitted by said assigned auxiliary security device is not detected, the access to the respective banking account from said portable electronic device is blocked and/or discontinued.

Also preferably the process of locating the assigned auxiliary security device through the short range wireless (e.g., Bluetooth®) technology is initiated during an attempt to access the respective bank account from said portable electronic device.

It is also advantageous when the attempts to locate the assigned auxiliary security device through the short range wireless (e.g., Bluetooth®) technology are repeated at regular intervals lasting at most 30 seconds, the duration of the location process being at least equal to that of logging in to the respective online banking system.

The key, which is stored in the assigned auxiliary security device, is preferably always automatically altered after being used.

According to a particularly preferred embodiment the step ii) comprises the partial steps of creating a symmetrical key by deriving the same from the respective bank's public key and the respective private key stored in the auxiliary security device and writing such symmetrical key into the storage unit of the auxiliary security device and/or that the assignment of the auxiliary security device to said portable electronic device, which is carried out in the step iii), consists in that the portable electronic device generates a transport key and sends the same along with the identification data of the bank's public key through the short range wireless (e.g., Bluetooth®) connection to the auxiliary security device that will subsequently calculate its own key, which is required for the step v), on the basis of both the previously stored data and the received data.

The objective is also achieved according to the invention by means of an auxiliary security device, comprising a storage unit, a processing unit and wireless communication means using a short range wireless (e.g., Bluetooth®) protocol, wherein the storage unit of the auxiliary security device contains a software which enables the above specified method.

The objective is also achieved according to the invention by means of a portable electronic device, comprising a storage unit, a processing unit, means for accessing the Internet interconnected with said processing unit and wireless communication means using a short range wireless (e.g., Bluetooth®) protocol, wherein the storage unit of the portable electronic device contains a software which enables the above specified method.

The objective of to the invention is especially achieved by means of a set consisting of a portable electronic device and an auxiliary security device, the portable electronic device comprising a storage unit, a processing unit, means for accessing the Internet interconnected with said processing unit and wireless communication means using a short range wireless (e.g., Bluetooth®) protocol, wherein the auxiliary security device comprises a storage unit, a processing unit and a wireless communication means using a short range wireless (e.g., Bluetooth®) protocol, the storage unit of the auxiliary security device containing a software which enables the above specified method.

Preferably, said assigned auxiliary security device comprises means for emitting an acoustic signal and said portable electronic device comprises a switch for causing the acoustic signal to be emitted by said assigned auxiliary security device and/or said portable electronic device comprises means for emitting an acoustic signal and said assigned auxiliary security device comprises a switch for causing the acoustic signal to be emitted by said portable electronic device.

DESCRIPTION OF THE EXEMPLARY EMBODIMENTS

Figure 1:
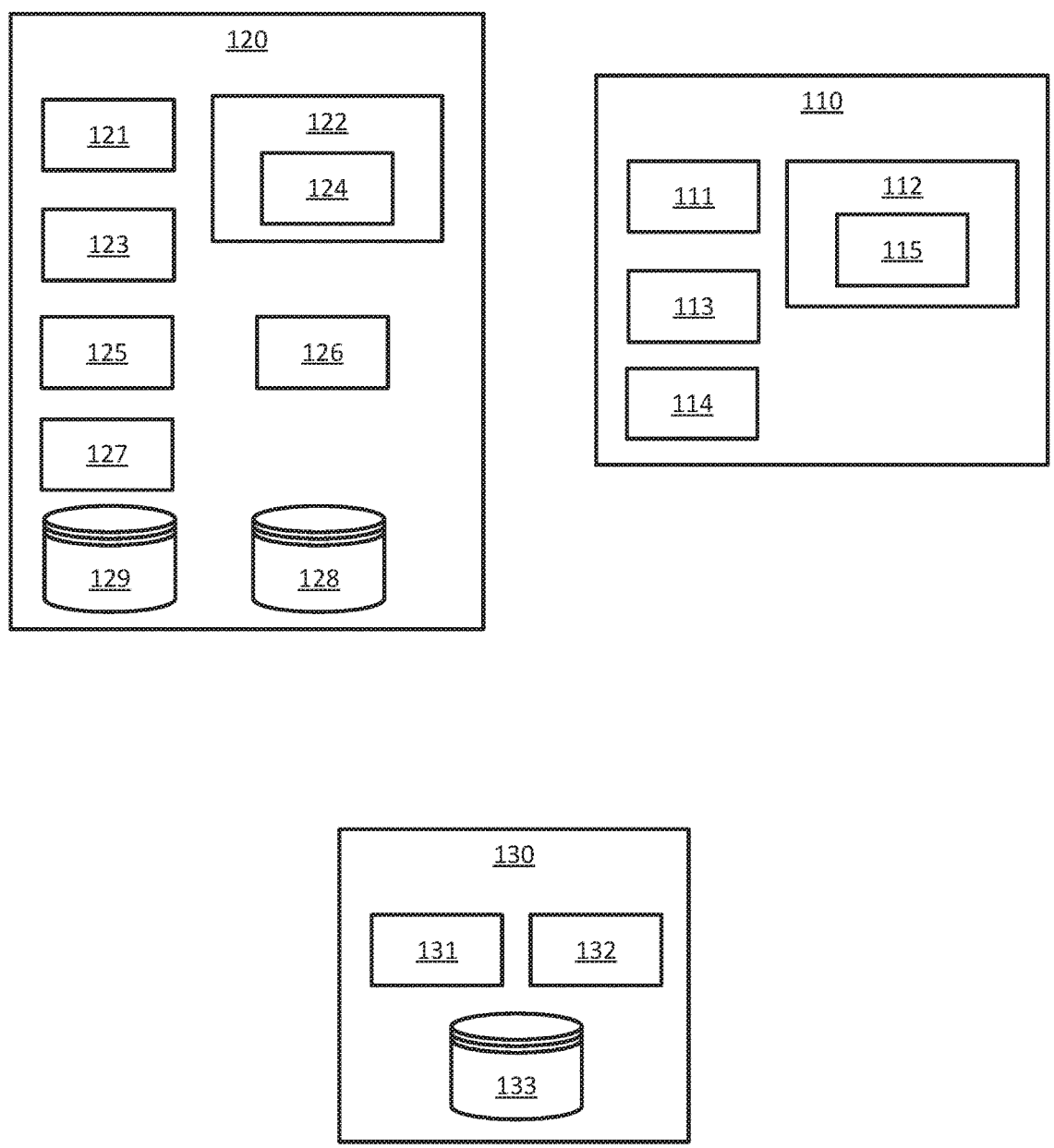
FIG. 1 is a system for securing bank account access in accordance with one embodiment of the present invention.

In an exemplary embodiment illustrated in FIG. 1, the system according to the invention comprises a mobile telephone 110, preferably a smartphone, which forms a portable electronic apparatus, and a small electronic item, such as a key fob or simply fob 120, which constitutes an auxiliary security device. The mobile telephone 110 comprises a processing unit or processing device or hardware processor 111, a storage unit or storage device 112, an Internet communication device 113 for accessing the Internet, and a short range wireless communication device 114 for wireless communication by means of a short range wireless protocol (e.g., the IEEE 802.15.1, or Bluetooth®, protocol), and the mobile telephone 110 is equipped with a software application 115 stored on the storage unit 112 enabling the corresponding Internet banking services to be used. The fob 120 comprises a processing unit or processing device or hardware processor 121, a storage unit or storage device 122, and a wireless communication device 123 using a short range wireless protocol (e.g., the IEEE 802.15.1, or Bluetooth®, protocol, such as Bluetooth® 4.0 Low Energy), and is equipped with a software application 124 stored on the storage unit 122 enabling the communication with the respective mobile telephone 110 to be established. Both the apparatuses are uniquely mutually identifiable. A single fob 120 can be used for one or more applications in different devices and a single application installed in a given device can be linked to one or more fobs 120.

Figure 2:
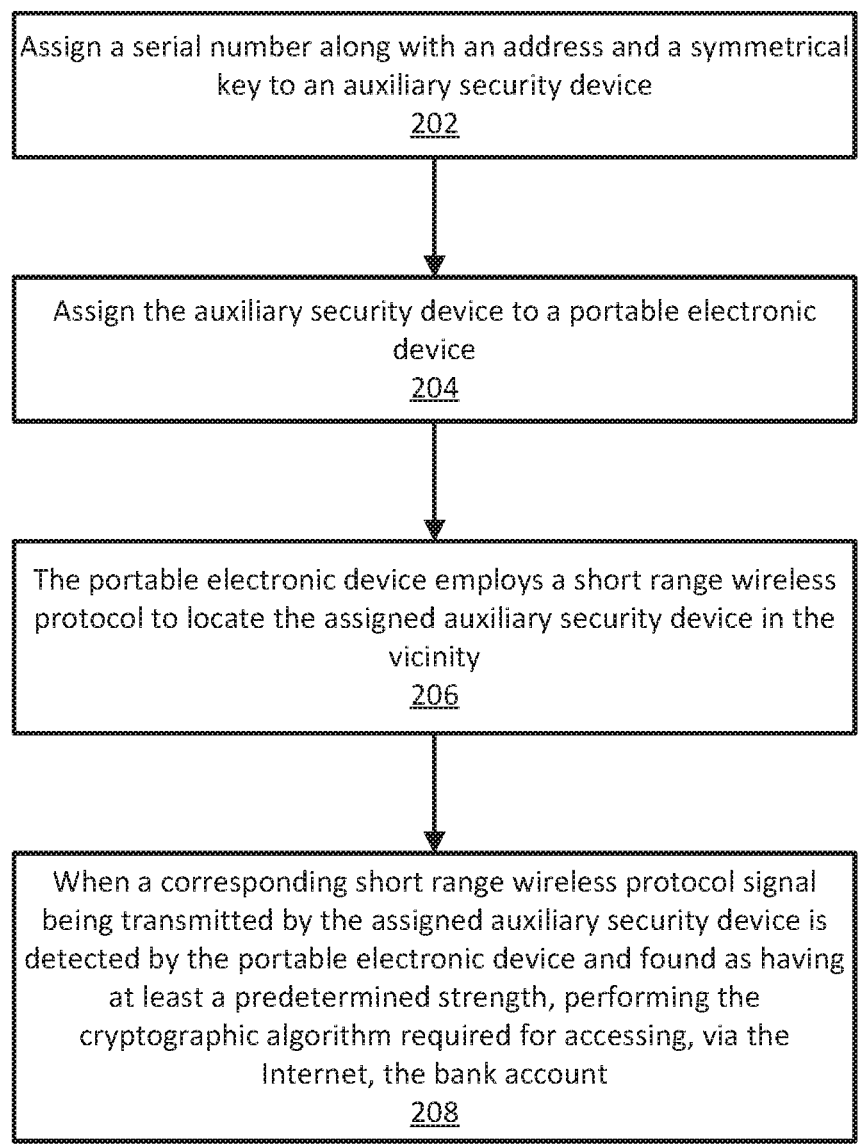
FIG. 2 is a flow chart illustrating operations of a method for securing bank account access in accordance with one embodiment of the present invention.

The system according to the present exemplary embodiment works in the following manner. Both the mobile telephone 110 and the fob 120 are provided with a dedicated software application 115 and 124, respectively, that makes it possible that the devices can uniquely identify each other. The owner of the mobile telephone 110 logs in from the latter via the respective network to his online banking account. For this purpose, the user can, for example, enter an authentication code or password, as already well known from the state of the art. Simultaneously, the mobile telephone 110 searches for a signal sent by the associated fob 120 in the surrounding area, for example within the range of 20 meters. The available coverage can be determined by the transmitting range of the associated device, when the communication based on a short range wireless protocol (e.g., Bluetooth® protocol) should be established. Alternatively, a fixed covered area can be set by determining the minimum required signal strength, such area having a smaller radius when compared to the maximum transmitting range of the respective device. If the mobile telephone 110 detects the presence of the associated fob 120 within the given range, it will enable an attempt to log in to the respective online banking account, the fob 120 providing a component of the cryptographic algorithm used for the login task (FIG. 2 block 208) (it is involved in the process of signing the respective login request). Thus, the procedure of logging in to the online banking account from a mobile telephone 110 is additionally secured by an auxiliary security device or fob 120 but the owner of the mobile telephone 110 has neither to search for such security device or fob 120, turn it on and copy a code from it, nor to use additional identity authentication apparatuses connected to his mobile telephone 110, such as those for detecting the user's iris or fingerprints. All the owner of the mobile telephone 110 has to do is to keep the associated fob 120 in his pocket or bag. If the mobile telephone 110 fails to find the associated fob 120 within the given range, the access to the respective online banking service will be denied.

If the attempt to log in to the online banking account is successful, the mobile telephone 110 continues to monitor the availability of the associated fob 120. In the case that the connection to the fob 120 gets lost for more than, e.g., 5 seconds, the access to the respective online banking service will be blocked or disconnected. This can occur, for example, in the case that the owner of the mobile telephone 110 has logged in to his online banking account in a public open space and after that an unauthorized person yanks the mobile telephone 110 out of the owner's hand and is running away with it. The fob 120 is also involved in securing any further activities the user is carrying out after having established the connection to his online banking account. Thus, it is not possible to sign and consequently perform selected transactions (such as new payments) when the fob 120 is not available because the latter directly participates in providing the user's signature to the respective request. Furthermore, the user's signature is unambiguously verifiable on the side of the respective online banking system—the fob 120 is globally recognizable as well as pre-personalized and uniquely set up in the factory.

This means that each individual fob 120 is pre-personalized in the factory. From the technical point of view, the particular initial personalization will be carried out through the mediation of a corresponding personalization station.

The overall security scheme includes, among others, the parameters based on the bank's private and public keys 131 and 132, respectively, as well as on the private and public keys 125 and 126, respectively, of each individual fob 120

(which are unique for each instance of the device). The bank's private key 131 is not involved in the process of the personalization of the individual fobs 120. Instead, solely the bank's public key 132 is used throughout the manufacturing process during which the individual fobs 120 are prepared.

The pair consisting of the bank's private and public keys 131 and 132, respectively, can be pre-calculated on a one-time basis before completing the factory settings of the respective fob 120 (if need be, particularly for capacity reasons, the keys 131 and 132 may be pre-calculated for a given geographic area, e.g. Central Europe, within which the fob 120 should be transferable). The way how the bank's private key 131 is handled is subject to special rules due to the sensitivity of such key. This means that the private key 131 should be handed over to the respective bank 130 in accordance with a secure procedure.

The bank 130 will also obtain a database or Table S 133 containing the public keys 126 of all the fobs 120 (or all the fobs 120 issued for a given geographic area within which the transferability between two or more banks 130 should be ensured).

During the personalization process, a unique symmetrical key 127 will be stored into each individual fob 120, which symmetrical key 127 has been derived from the respective bank's private key 131 and the respective private key 125 of the given fob 120. In order to ensure that a bank 130 can authenticate a fob 120 issued by another bank 130 (i.e., to ensure the transferability of the fobs 120 between two or more banks 130), a single derived symmetrical key 127 generated per bank 130 is replaced by a database or Table T 128, which contains e.g. 64 derived symmetrical keys 127 assigned to the corresponding indices of the Table T 128 for 64 different banks, the indices and the corresponding private keys 131 of the respective banks being assigned to each particular bank 130 in a subsequent separate step (this means, that a fob 120 can be manufactured and pre-personalized before the given bank 130 obtains its private key 131). Subsequently the bank 130 receives the respective index contained in the Table T 128. This index will be used by the bank 130 for addressing its specific symmetrical key 127 which—as already explained—has been additionally calculated from the private key 125 of the fob 120 and from the bank's public key 132 and which corresponds to the bank's private key 131 and to the public key 126 of the fob 120.

Thereby, the bank 130 can work with its own private key 131, the database or Table S 133 containing the public keys 126 of all the fobs 120 and the specific index contained in the Table T 128 stored in the fob 120 and is able to use these items for addressing a symmetrical key 127 generated on the basis of private key 125 of the fob 120 and the bank's public key 132.

The final personalization of the fob 120 (i.e., linking the fob 120 to the client's bank account) is carried out by the end user on his portable electronic device by means of a software application, for example on his mobile telephone 110 by means of a mobile application 115. The instructions relating to the procedure of the final personalization are preferably presented through the user interface of the mobile telephone 110. The final personalization consists in that a "slot" is reserved for the given application in the database or Table A 129 of the interconnected applications. This slot corresponds to a specific location in the Table A 129 and contains further symmetrical keys which have been generated and which are used for signing individual requests. During the process of allocating the slot, which is performed by means of the application 115, the user must actively confirm the corresponding operation, for example by pushing a specific button on the auxiliary security device or fob 120. In the case that all the available slots contained in the Table A 129 are occupied, the mobile telephone 110 presents a list to the user for selecting a slot to be overwritten. This overwriting operation may require to be additionally confirmed, for example by pushing a specific button on the auxiliary security device or fob 120 twice.

Thus, the particular process of the final personalization of a fob 120 can be as follows:

1. The mobile software application 115, which is intending to allocate a slot contained in the table A 129, generates a transport key and selects an index that is assigned to the public key 132 of a particular bank 130 in the allocation Table T 128.
2. The fob 120 generates a symmetrical key 127 for prospective signing of individual certification prompts and completes the calculation of the cryptogram relating to said symmetrical key 127 and to an additional security constant (the latter serving for providing the respective algorithms with entropy). These symmetrical keys 127 are stored in the Table A 129 in the fob 120.
3. The mobile software application 115, which is intending to allocate a slot, will then store its slot along with the signature of the same in order to be able to identify the state of the slot and to recognize that the slot has not been overwritten by another application.
4. Afterwards, the keys stored in the Table T 128 will be used for completing a secure transfer of the corresponding key contained in Table A 129, which is stored in the fob 120, by means of a network connection for the purpose of the future signing procedure to be performed in response to the certification prompts issued by the end systems (server systems) of the respective bank 130.

Since then, it is possible to use the data contained in the Table A 129, which is stored in the fob 120, for signing the individual transactions because the securely transferred secret key, which is required in connection with such signing procedure, will be shared by the bank 130 and the respective fob 120.

After completing the personalization, the fob 120 is ready to be used in a regular way:

In the case, that the software application 115 installed in a portable electronic device, such as a mobile telephone 110, requires an interoperability with the respective fob 120, the process will be as follows:

1. The mobile software application 115 calculates a certification prompt.
2. The fob 120 calculates the corresponding certification response using the key for signing certification prompts (Table A 129). In fact, there may be two types of the key for signing the certification prompts:
   a. A regular type that may be issued without requiring the respective operation to be manually confirmed on the fob 120, for example, by pushing a specific button. This type is particularly suitable for the operations having a lower sensitivity level.
   b. A type with an increased security level that may only be issued after the respective operation has been confirmed on the fob 120, for example, by pushing a specific button. This type is particularly suitable for some highly sensitive active operations.
3. The fob 120 performs renewal of the transport key.

Preferably, the entire communication between the fob 120 and the portable electronic device or mobile telephone 110 is based on the default encryption of the short range wireless protocol (e.g., Bluetooth® 4.x). The communication between the mobile software application 115 and the fob 120 is (in addition to the standard encryption for Bluetooth®) protected by the transport key that has been set during the allocation of the slot used. The latter key is shared by the mobile banking application and the fob 120 (which means that it is not intended to be handed over to the respective bank 130). One of the features of the above described security scheme is the so called Forward Secrecy. In the case that the mobile telephone 110 is stolen, the latter feature prevents the communication protected by the transport key assigned to that mobile telephone 110 from being compromised in the future. Then, such a key cannot be used for decrypting any radio communication between the mobile telephone 110 and the fob 120 which might have been captured and stored in the past.

Furthermore, using the independent transport key besides the key for signing certification prompts (Table A 129), means that the portable electronic device (such as mobile telephone 110) is entitled to load the transaction data to be authenticated into the auxiliary security device or fob 120 but will not be permitted to authenticate the corresponding transaction by itself. The security of the data being loaded is not only based on the standard level of protection provided by the short range wireless protocol (e.g., Bluetooth® 4.x) but is additionally protected by the concept of the transport key featuring the so called forward secrecy. This is achieved through a unidirectional derivation of the new transport key at both ends (i.e., both in the mobile telephone 110 and in the fob 120) after having used the existing one. Hence, two cryptographically protected channels (through confidentiality and integrity) are established: key fob 120 <---->mobile telephone 110 and key fob 120 < - - - > bank 130. In fact, an adequate respect towards either channel allows to create schemes wherein the mobile telephone 110 and the fob 120 will jointly prepare and authenticate the individual transactions in a manner that will make either device absolutely indispensable for a potential intruder. If a fob 120 gets stolen, it will not be usable for loading the correct authentication data because the corresponding transport key will remain unknown to the thief. On the contrary, if a mobile telephone 110 gets stolen, the authentication key stored in the corresponding fob 120 will remain unavailable (Table A 129).

In other words, the mobile telephone 110 (mobile software application 115) sends the data, which is necessary for the signing procedure (in the form of a challenge), to the auxiliary security device or fob 120 and, afterwards, the latter returns the corresponding signature (in the form of a response) to the former. The way how the response is subsequently handled by the mobile banking system depends on the implementation within the framework of the particular application (e.g., a specific mobile banking application). Since the challenge-response process is typically based on the random nature of the "challenge" part (and consequently on the random nature of the "response" part, as well), the "response" part cannot be directly used for decrypting the data stored in the portable electronic device or mobile telephone 110. According to an exemplary embodiment, the bank 130 either calculates its "own software-based signature" through its mobile application (depending on the preceding implementation made by the particular user) and, afterwards, the mobile telephone 110 sends a pair of signatures (one software-based signature according to the implementation made by the bank 130 and the other signature generated in the auxiliary security device or fob 120; which means that the signatures are duplicated), or "mixes" the response part into its own software algorithm. In the latter case, the signature will be constituted by a compound function of what has been calculated by the auxiliary security device or fob 120 and what has been calculated by the banking application running on the portable electronic device or mobile telephone 110. The subsequent verification performed by the bank's server consists in that the bank 130 uses its own algorithm for completing the calculation of the signature and the algorithm, which has been assigned by the given device, for inferring the expected response part (again, the bank 130 will either proceed in a parallel manner and calculate two signatures, or in an alternative manner consisting in completing the calculation of the expected response part and "mixing" the obtained result into the existing algorithms).

The applicable algorithms used for the asymmetric cryptography can be based, for example, on the Diffie-Hellman key exchange protocol utilizing elliptical curves (for this purpose, the following curve can be used as an exemplary one: P256). The preferred protocol utilizes the integer d for the private key and the point [x,y] for the public key. The public key can be represented solely by the particular value of the x coordinate (the corresponding y coordinate can be inferred by means of the "point compression" method). The complete procedure based on the asymmetrical cryptography is carried out either on the side of the respective bank (during the verification stage) or on the side of a personalization station (during the initial personalization of the auxiliary security device or fob 120). In the key fob 120 itself, solely the symmetrical cryptographic procedure is carried out (using an AES algorithm).

In another exemplary embodiment, the system according to the present invention enables the respective portable electronic device or mobile telephone 110 to be located/drop-called through the auxiliary security device or fob 120, provided that both the devices are within reach of each other. Pushing a button on the auxiliary security device or fob 120 will initiate the signalling feature of the portable electronic device or mobile telephone 110 which facilitates the same to be located. When so enabled, the portable electronic device or mobile telephone 110 may be also used for finding the corresponding auxiliary security device or fob 120. A typical example could be represented locating a smartphone or tablet PC by means of a key fob or locating a key fob by means of a smartphone or tablet PC.

For the purpose of the above description, a key fob 120 was used as an example of the preferred auxiliary security device. However, it is obvious that any suitable portable item, preferably that having small dimensions, can be used, provided that comprises corresponding electronic parts, namely a processing unit, a storage unit, a battery and a wireless communication device based on the Bluetooth® technology. For example, a watch, a bracelet, or the like can be used.

Although the exemplary embodiments of the present invention, which are described hereinbefore, are considered to be the preferred ones, those skilled in the art will appreciate that various modifications of some features of the technical solutions as well as alternatives thereto are also possible. Therefore, the scope of the protection is defined, disregarding the presented preferred embodiments, by the wording of the appended patent claims.

The invention claimed is:

1. A method for securing a bank account against an unauthorized access from a portable electronic device, the portable electronic device comprising means for accessing the Internet and wireless communication means using a short range wireless protocol, the securing being provided using an auxiliary security device, the auxiliary security device comprising wireless communication means using the short range wireless protocol, wherein the portable electronic device is adapted for controlling a bank account via the Internet, the method comprising:
  i) assigning a serial number along with an address and a symmetrical key to an auxiliary security device, wherein said symmetrical key is derived from a public key of a banking institution and a private key of the auxiliary security device, wherein said address and said public key of the banking institution are stored in a data processing system of the banking institution;
  ii) assigning the auxiliary security device to said portable electronic device;
  iii) wherein the portable electronic device employs the short range wireless protocol to locate said assigned auxiliary security device in the vicinity; and
  iv) wherein, when a corresponding short range wireless protocol signal being transmitted by said assigned auxiliary security device is detected by said portable electronic device and found as having at least a predetermined strength, performing a cryptographic algorithm required for accessing the bank account from the portable electronic device via the means for accessing the Internet thereof, wherein said performing the cryptographic algorithm includes the auxiliary security device interacting with the portable electronic device to perform the cryptographic algorithm on the basis of a combination of information that is indicative of a transport key stored in the portable electronic device and data that is indicative of the symmetrical key stored in the auxiliary security device assigned thereto.

2. The method according to claim 1 further comprising, when the short range wireless protocol signal being transmitted by said assigned auxiliary security device is not detected, enabling at least one of blocking and discontinuing the access to the banking account from said portable electronic device.

3. The method according to claim 1, the process of locating the assigned auxiliary security device through the short range wireless technology during an attempt to access the bank account from said portable electronic device.

4. The method according to claim 1, further comprising repeating the attempts to locate the assigned auxiliary security device through the short range wireless protocol at regular intervals lasting at most 30 seconds at least during a time when the portable electronic device is logged in the bank account.

5. The method according to claim 1, further comprising automatically altering the key, which is stored in the assigned auxiliary security device, after the key has been used.

6. The method according to claim 1, further comprising at least one of:
  (i) writing said symmetrical key into the storage device of the auxiliary security and device;
  (ii) wherein said assigning of the auxiliary security device to said portable electronic device comprises generating, in the portable electronic device, the transport key and sending the generated transport key along with information indicative of the public key of the banking institution through a short range wireless connection from the portable electronic device to the auxiliary security device.

7. An auxiliary security device comprising:
  a storage device comprising a non-transitory computer readable medium;
  a processing device; and
  a wireless communication device using a short range wireless protocol,
  wherein the storage device of the auxiliary security device contains instructions that, when executed by the processing device, configure the auxiliary security device to:
    transmit information that is indicative of at least a first portion of a security key from the auxiliary security device to the portable electronic device for use in combination with information that is indicative of at least a second portion of the security key that is stored in said portable electronic device to enable the portable electronic device to securely access a bank account provided by a banking institution via the Internet,
    assign a serial number along with an address to the auxiliary security device, wherein said address and said public key of the banking institution are stored in a data processing system of the banking institution;
    assign the auxiliary security device to the portable electronic device;
    wherein the portable electronic device employs the short-range protocol to locate said assigned auxiliary security device in the vicinity; and
    wherein, when a corresponding short range signal being transmitted by said assigned auxiliary security device is detected by said portable electronic device and found as having at least a predetermined strength, performing a cryptographic algorithm required for accessing the bank account from the portable electronic device via the Internet, wherein said performing the cryptographic algorithm includes the auxiliary security device interacting with the portable electronic device to perform the cryptographic algorithm on the basis of a combination of information that is indicative of a transport key stored in the portable electronic device and data that is indicative of the symmetrical key stored in the auxiliary security device assigned thereto; and
  wherein the auxiliary security device has a symmetrical key assigned thereto, wherein said symmetrical key is derived from a public key of the banking institution and a private key of the auxiliary security device.

8. A portable electronic device comprising:
  a storage device comprising a non-transitory computer readable medium; a processing device;
  an Internet communication device for accessing the Internet interconnected with said processing device; and
  a wireless communication device using a short range wireless protocol, wherein the storage device of the portable electronic device contains instructions that, when executed by the processing device, configure the portable electronic device to:
    use information that is indicative of at least a first portion of a security key that is wirelessly received, in a signal using said short range wireless protocol, from an auxiliary security device in combination with information that is indicative of at least a second portion of the security key that is stored in said portable electronic device to enable the portable electronic device to securely access a bank account provided by a banking institution via the Internet communication device and the Internet, assign a serial number along with an address to the auxiliary security device, wherein said address and said public key of the banking institution are stored in a data processing system of the banking institution;

assign the auxiliary security device to the portable electronic device;

wherein the portable electronic device employs the short-range protocol to locate said assigned auxiliary security device in the vicinity; and wherein, when a corresponding short range signal being transmitted by said assigned auxiliary security device is detected by said portable electronic device and found as having at least a predetermined strength, performing a cryptographic algorithm required for accessing the bank account from the portable electronic device via the Internet, wherein said performing the cryptographic algorithm includes the auxiliary security device interacting with the portable electronic device to perform the cryptographic algorithm on the basis of a combination of information that is indicative of a transport key stored in the portable electronic device and data that is indicative of the symmetrical key stored in the auxiliary security device assigned thereto; and wherein the auxiliary security device has a symmetrical key assigned thereto, wherein said symmetrical key is derived from a public key of the banking institution and a private key of the auxiliary security device.

9. A system comprising: a portable electronic device comprising:

a storage device comprising a non-transitory computer readable medium; a processing device;

an Internet communication device for accessing the Internet interconnected with said processing device; and a wireless communication device using a short range wireless protocol; and an auxiliary security device comprising:

a storage device comprising a non-transitory computer readable medium; a processing device; and a wireless communication device using the short range wireless protocol, wherein the storage device of the auxiliary security device contains instructions that, when executed by the processing device of the auxiliary security device configures the auxiliary security device to:

transmit information that is indicative of at least a first portion of a security key from the auxiliary device to the portable electronic device, in a signal using said short range wireless protocol, and wherein the storage device of the portable electronic device contains instructions that, when executed by the processing device of the portable electronic device configures the portable electronic device to:

use information that is indicative of at least the first portion of the security key that is wirelessly received in the portable electronic device, in the signal using said short range wireless protocol, from the auxiliary security device in combination with information that is indicative of at least a second portion of the security key that is stored in the portable electronic device to enable the portable electronic device to securely access a bank account provided by a banking institution via the Internet communication device and the Internet, assign a serial number along with an address to the auxiliary security device, wherein said address and said public key of the banking institution are stored in a data processing system of the banking institution;

assign the auxiliary security device to the portable electronic device;

wherein the portable electronic device employs the short-range protocol to locate said assigned auxiliary security device in the vicinity; and wherein, when a corresponding short range signal being transmitted by said assigned auxiliary security device is detected by said portable electronic device and found as having at least a predetermined strength, performing a cryptographic algorithm required for accessing the bank account from the portable electronic device via the Internet, wherein said performing the cryptographic algorithm includes the auxiliary security device interacting with the portable electronic device to perform the cryptographic algorithm on the basis of a combination of information that is indicative of a transport key stored in the portable electronic device and data that is indicative of the symmetrical key stored in the auxiliary security device assigned thereto; and wherein the auxiliary security device has a symmetrical key assigned thereto, wherein said symmetrical key is derived from a public key of the banking institution and a private key of the auxiliary security device.

* * * * *